US011478826B2

(12) United States Patent
Gruna

(10) Patent No.: US 11,478,826 B2
(45) Date of Patent: Oct. 25, 2022

(54) METHOD AND DEVICE FOR SORTING PARTICLES OF A MATERIAL FLOW

(71) Applicant: Fraunhofer-Gesellschaft zur Förderung der angewandten Forschung e.V., Munich (DE)

(72) Inventor: Robin Gruna, Baden-Baden (DE)

(73) Assignee: Fraunhofer-Gesellschaft zur Förderung der angewandten Forschung e.V., Munich (DE)

( * ) Notice: Subject to any disclaimer, the term of this patent is extended or adjusted under 35 U.S.C. 154(b) by 0 days.

(21) Appl. No.: 16/765,848

(22) PCT Filed: Nov. 19, 2018

(86) PCT No.: PCT/EP2018/081793
§ 371 (c)(1),
(2) Date: May 20, 2020

(87) PCT Pub. No.: WO2019/101691
PCT Pub. Date: May 31, 2019

(65) Prior Publication Data
US 2020/0360970 A1    Nov. 19, 2020

(30) Foreign Application Priority Data
Nov. 21, 2017 (DE) ..................... 10 2017 220 792.2

(51) Int. Cl.
*G01N 15/14* (2006.01)
*B07C 5/36* (2006.01)
*B07C 5/342* (2006.01)

(52) U.S. Cl.
CPC .............. *B07C 5/36* (2013.01); *B07C 5/3425* (2013.01); *G01N 15/147* (2013.01); *B07C 2501/0018* (2013.01); *G01N 2015/149* (2013.01)

(58) Field of Classification Search
CPC ......... B07C 5/36; B07C 5/366; B07C 5/3425; B07C 2501/0018; G01N 21/85;
(Continued)

(56) References Cited

U.S. PATENT DOCUMENTS

| 5,125,514 A * | 6/1992 | Oehler ................. G01N 33/362 367/87 |
| 2002/0064809 A1 * | 5/2002 | Mutz .................. G01N 35/1074 435/40.5 |

(Continued)

FOREIGN PATENT DOCUMENTS

| DE | 10157032 A1 | 6/2003 |
| DE | 102014207157 A1 | 9/2015 |

OTHER PUBLICATIONS

"International Application No. PCT/EP2018/081793, International Search Report dated Feb. 11, 2019", (dated Feb. 11, 2019), 2 pgs.

(Continued)

*Primary Examiner* — Michael McCullough
*Assistant Examiner* — Jessica L Burkman
(74) *Attorney, Agent, or Firm* — Schwegman Lundberg & Woessner, P.A.

(57) ABSTRACT

The invention relates to a method and to a device for sorting particles of a material flow into at least two fractions, the particles in the material flow being observed by means of at least one detector, particles being subjected to acoustic pressure on the basis of the properties determined by the detector so that they are supplied to different fractions.

20 Claims, 6 Drawing Sheets

(58) Field of Classification Search
CPC .......... G01N 15/147; G01N 2015/149; G01N 2015/1081; G01N 2015/142
See application file for complete search history.

(56) References Cited

U.S. PATENT DOCUMENTS

| | | | |
|---|---|---|---|
| 2009/0021751 A1* | 1/2009 | Jonasson Bjarang | B07C 5/3425 356/601 |
| 2009/0029870 A1* | 1/2009 | Ward | G01N 27/447 210/695 |
| 2013/0047728 A1* | 2/2013 | Cochran | B01L 3/502761 73/570.5 |
| 2013/0206651 A1* | 8/2013 | Huber | B07C 5/3425 356/601 |

OTHER PUBLICATIONS

"International Application No. PCT/EP2018/081793, Written Opinion dated Feb. 11, 2019", (dated Feb. 11, 2019), 5 pgs.
Carter, Tom, et al., "UltraHaptics: multi-point mid-air haptic feedback for touch surfaces", Proceedings of the 26th annual ACM symposium on User interface software and technology, (Oct. 8-11, 2013), pp. 505-514.
Foresti, Daniele, et al., "Acoustophoretic contactless transport and handling of matter in air", Proceedings of the National Academy of Sciences 110.31, (Jul. 30, 2013), 12549-12554.
Hasegawa, Keisuke, et al., "Aerial display of vibrotactile sensation with high spatial-temporal resolution using large-aperture airborne ultrasound phased array", 2013 World Haptics Conference (WHC). IEEE, (Apr. 14-18, 2013), 31-36.
Hoshi, Takayuki, et al., "Adding tactile reaction to hologram", RO-MAN 2009—The 18th IEEE International Symposium on Robot and Human Interactive Communication. IEEE, (Sep. 27-Oct. 2, 2009), pp. 7-11.
Hoshi, Takayuki, et al., "Noncontact tactile display based on radiation pressure of airborne ultrasound", IEEE Transactions on Haptics 3.3, (2010), 155-165.
Inoue, Seki, et al., "Active touch perception produced by airborne ultrasonic haptic hologram", 2015 IEEE World Haptics Conference (WHC). IEEE, (Jun. 22-26, 2015), pp. 362-367.
Li, Peng, et al., "Acoustic separation of circulating tumor cells", Proceedings of the National Academy of Sciences 112.16, (Apr. 21, 2015), 4970-4975.
Marzo, Asier, et al., "Holographic acoustic elements for manipulation of levitated objects", Nature communications 6, (Oct. 27, 2015), pp. 1-7.
Melde, Kai, et al., "Holograms for acoustics", Nature 537.7621, (Sep. 21, 2016), 518-522.
Rauch, W., "New ejection principle for optical sorters in waste applications", 7th Sensor-Based Sorting & Control 2016, (2016), p. 141-145.

* cited by examiner

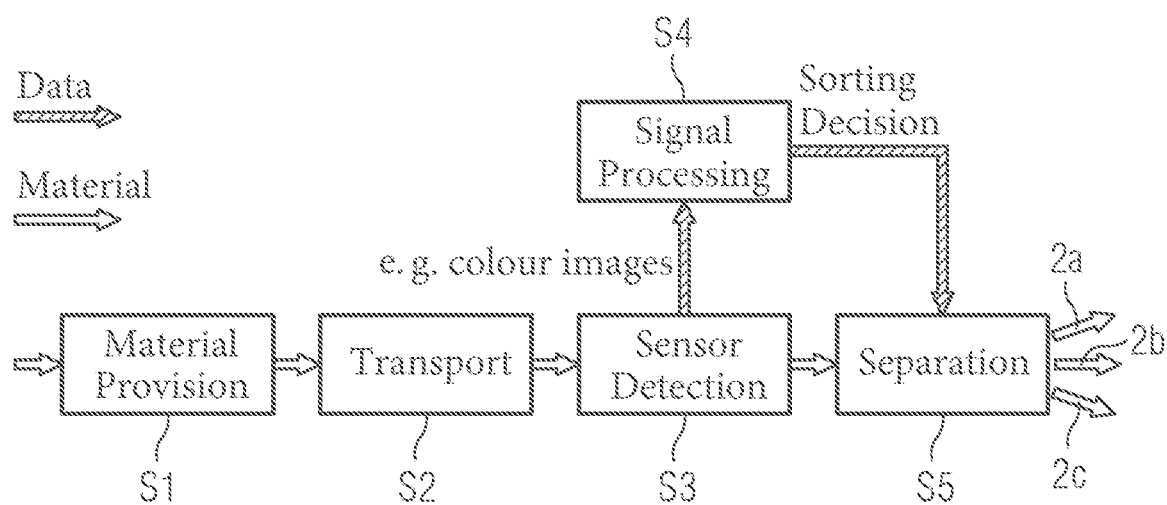

METHOD AND DEVICE FOR SORTING PARTICLES OF A MATERIAL FLOW

PRIORITY APPLICATIONS

This application is a U.S. National Stage Filing under 35 U.S.C. 371 from International Application No. PCT/EP2018/081793, filed on Nov. 19, 2018, and published as WO20191101691 on May 31, 2019, which claims the benefit of priority to German Application No. 10 2017 220 792.2, filed on Nov. 21, 2017; the benefit of priority of each of which is hereby claimed herein, and which applications and publication are hereby incorporated herein by reference in their entireties.

The invention relates to a method and to a device for sorting particles of a material flow into at least two fractions, the particles in the material flow being observed by means of at least one detector, particles being subjected to acoustic pressure on the basis of the properties detected by the detector so that they are supplied to different fractions.

Automatic bulk material sorting makes it possible to separate, by means of digital image acquisition and—processing, bulk materials with a high throughput into different fractions (e.g. into a good and defective fraction) by means of optically or physically detectable features. After the sensory detection and evaluation of the individual bulk material particles, these must be removed from the material flow to be sorted so that consequently two or more new bulk material fractions are produced. In general, the sorting is thereby designed such that the proportion of objects to be ejected, relative to the input material flow, is low. For example in foodstuffs inspection, rather rarely occurring foreign bodies are separated as defective material by blowing out from a material flow to be cleaned. In the sorting of minerals, however, individual precious stones or precious metal ores are ejected as good material from the material flow of secondary rock which is predominant mass-wise.

Separation represents an indispensable component in automatic sorting and is crucially decisive as to the possibility of use thereof in principle for a given product and the achievable sorting quality. During sorting into two fractions, the separation error is composed of the incorrect ejection of the basic material which is predominant in the ratio (so-called "bycatch") and incorrectly non-ejected target material (so-called "leakage"), these being of varying seriousness as a function of the problem. Many tasks in practice cannot be solved at present by automatic sorting because of a lack of suitable separation methods although suitable sensor solutions for inspection of materials are available. Examples of this are in particular fine-granular materials which have a particle size of less than 2 mm. These occur for example in the form of powders in the pharmaceutical and foodstuffs sphere or occur in the recycling field as a fine fraction in the comminution of plastic materials, recycled glass or building waste.

In W. Rauch, "New ejection principle for optical sorters in waste applications", in 7th Sensor-Based Sorting & Control 2016, 2016, p. 141, the state of the art relating to separation methods in sensor-assisted bulk material sorting is presented. These can be divided roughly into pneumatic and mechanical methods and are summarised subsequently.

Pneumatic separation by means of compressed air nozzles is widespread and is used inter alia in foodstuffs inspection. The nozzle form and also the duration and intensity of the compressed air jets must thereby be adapted to the product to be sorted. Substantial disadvantages in this approach are the high production costs for compressed air and also the limited spatial precision in material ejection. In addition, due to the compressed air jets, air turbulences which disturb the material transport during separation and greatly influence the surrounding bulk material particles are easily produced. Precisely in the case of fine-granular materials, this is problematic and can lead to stirred-up material passing into the field of vision of the camera and interfering with the material observation and evaluation.

Likewise, suction cups by means of which individual objects can be removed from a material flow operate pneumatically. For this, the objects must however have a suitable surface nature, minimum size and similar geometry.

In waste sorting, pick and place robot arms which remove individual objects from a conveyor belt are used. It is hereby of advantage that the material can be separated into a relatively large number of different fractions. Because of the consequently required complex mechanical movement of an individual robot or path planning in the case of a plurality of robots arms, the material throughput of this method is however greatly limited. Added to that are high purchase—and maintenance costs for the robot arms and also the restriction to large and mechanically grippable objects.

Simpler mechanical separation methods operate with flaps, mechanical fingers, movable conveyor belts or slides which remove the objects to be ejected from a conveyor belt or divert them by impact from a defined movement path. All mechanical methods have the disadvantage that, because of the discrete mechanical design (e.g. the number of moving elements) they have a limited spatial resolution for relatively large objects and these can only be ejected in a specified direction. In addition, these are restricted, in their operating range, to a straight line or a flat surface. This means that even if the 3D position of a particle to be ejected is known, this must be brought to a plane or straight line for separation and cannot be detected freely in 3D space.

It is the object of the present invention to indicate a method and a device for sorting particles of a material flow, with which particles, irrespective of their size, in particular small particles, are detectable with high spatial resolution for the sorting. Also fast sorting is intended to be made possible.

These objects are achieved by the method for sorting particles of a material flow into at least two fractions according to claim 1 and the device for sorting particles of a material flow according to claim 12. The respective dependent claims indicate advantageous developments of the method according to the invention and of the device according to the invention.

The method according to the invention for sorting particles is intended to be described firstly. In this method, particles of a material flow are sorted into at least two fractions. For this purpose, the particles in the material flow are observed by means of at least one detector. The detector detects values of at least one property of the particles, on the basis of which the particles are to be sorted, and also at least one position of the particles at at least one point in time.

All properties which are detectable are possible as properties on the basis of which the particles are sorted. The at least one detector is then precisely a detector which is suitable for detecting the corresponding property. There should hereby be understood, as property of the particles, a dimension in which the particles differ. Particles which differ in the property then have different values of the property. If for example particles with different colours are intended to be sorted into fractions of the same colour, then the property here would be the colour and the values of the property, for example red, green, etc., i.e. the actual colour which a given particle has. As detector, in this example a detector which is able to detect which colour a particle has would be used. With the detector, therefore the values, i.e. for example red, green etc., of the property "colour" could be detected. The fact therefore that the at least one detector detects values of at least one property of the particles means that the at least one detector can distinguish the particles on the basis of the at least one property.

There should be understood here as material flow, a quantity of particles in which particles with different values of the at least one property are present. Preferably, the particles thereby move in a flow, therefore for example the majority of the particles or all the particles move parallel to each other or essentially parallel to each other in the direction of a flow direction.

There should hereby be understood by fraction, a quantity of particles in which the particles have predominantly or all the same value of the property on the basis of which the particles are sorted.

According to the invention, the detector detects the value of the at least one property together with the position of the particles at at least one point in time. The detector is preferably a spatially-resolving detector for this purpose.

According to the invention, the particles with different values of the property are then supplied consequently to different ones of the fractions such that the particles are subjected to acoustic radiation pressure. Preferably, the acoustic radiation pressure is thereby generated temporally varying as a function of the measurements of the detector. Preferably, the particles are moved in the material flow in the method according to the invention, such that they move along known paths with a known temporal course of their position. If then one of the particles with a specific value of the at least one property is detected at a specific location, then, because of knowledge of the movement of the particles, it can be readily determined whether and if in fact at what time and at what location the particle must be subjected to the acoustic radiation pressure in order to be supplied to the fraction which corresponds to its property. The acoustic radiation pressure is then generated therefore such that it has a value at that point in time at which the particle is at the intended location for interaction with the acoustic radiation pressure, which subjects the corresponding particle to the required force in order to supply the particle to the fraction corresponding to its property.

The acoustic radiation pressure (or "quartz wind") represents the physical effect used for the described solution approach. This corresponds to a non-linear effect in acoustics which occurs in particular in strong ultrasound fields, for example from a sound pressure level of 120 dB (cf. K. Hasegawa and H. Shinoda, "Aerial display of vibrotactile sensation with high spatial-temporal resolution using large-aperture airborne ultrasound phased array", in 2013 World Haptics Conference (WHC), 2013, p. 31-36). The acoustic wave propagation is then highly distorted non-symmetrically so that, in the temporal average, an equal pressure different from zero is produced in the medium irradiated by sound waves. This so-called acoustic radiation pressure is manifested in an obstacle or an interface in the acoustic field as constant force which acts perpendicular to the propagation direction of the sound. According to Hoshi, M. Takahashi, T. Iwamoto, and H. Shinoda, "Noncontact tactile display based on radiation pressure of airborne ultrasound", *IEEE Trans. Haptics*, vol. 3, no. 3, p. 155-165, 2010, there applies for the acoustic radiation pressure P (in Pa) with the assumption of a level wave:

$$P = \alpha E = \alpha p^2 / (\rho c^2)$$

E corresponding to the energy density of the ultrasound $$\left( \text{in } \frac{J}{m^3} \right),$$

p to the acoustic pressure (in Pa), c to the sound speed $$\left( \text{in } \frac{m}{s} \right)$$

and $\rho$ to the density of the medium (in kg/m³). The acoustic radiation pressure P is hence proportional to the energy density E which is also termed acoustic pressure. The constant $\alpha$ is in the interval $1 \leq \alpha \leq 2$ and is by $\alpha \sim 1 + R^2$ dependent upon the reflection coefficient R of the object surface. If the ultrasound is reflected perfectly from the object surface, $\alpha = 2$. In the case of complete absorption, $\alpha = 1$. If an ultrasound beam is reflected perpendicularly at the object surface, the latter experiences a constant force in the direction of the incident ultrasound beam. It is evident from the above equation that the spatial and temporal distribution of the acoustic radiation pressure P can be controlled by a spatial and temporal modulation of the acoustic pressure p. In the following, the spatial acoustic pressure field at the time t is noted by $p_t(x, y, z)$ with x, y, z∈R.

In an advantageous embodiment of the invention, the acoustic radiation pressure can be generated therefore such that, at a respective interaction location of the particles, it causes a force, dependent upon the value of the at least one property of the corresponding particles, on the corresponding particles. The interaction location is thereby determined from the position of the respective particle detected by the detector, e.g. on the basis of knowledge of the movement of the particle in the material flow.

In an advantageous embodiment of the invention, the particles, at the time of detection of their position and of their value of the at least one property, are situated in free fall. This can be advantageous since the falling movement of the particles can be described very precisely so that also the location of the particle is known very precisely in order to subject it to the acoustic radiation pressure. Alternatively, the particles can however be situated in motion for example on a chute or be moved on a belt sorter.

Advantageously, the interaction locations of the particles, i.e. those locations at which the particles are subjected respectively to the acoustic radiation pressure, can be determined from the respectively detected position of the particle during detection by means of the detector, and also from the movement of the particles and a geometry of a structure used to transport the particles in the material flow. Particularly advantageously, the movement of the particles can thereby be determined also by the particles being detected at least twice. However it is a precondition here that the particles can be assigned to each other during the first detection and the second detection. Irrespectively, the movement of the particles can be determined advantageously from the conditions of the measuring device since, in the normal case, the particles there all complete essentially the same movement and this can be determined readily.

Advantageously, the acoustic radiation pressure to which the particles are subjected can be generated by means of at least one ultrasound phased array. Advantageously, also two ultrasound phased arrays can be used, which are disposed such that their acoustic generation directions, i.e. those directions in which the ultrasound phased arrays respectively imitate sound, are disposed relative to each other at a non-disappearing angle or are disposed opposite each other. Preferably, the one or the plurality of ultrasound phased arrays are disposed such that their sound generation directions are also at a non-disappearing angle to the material flow, i.e. in that direction in which the particles in the material flow move on average, preferably in the influence region of the ultrasound phased array(s). The ultrasound phased arrays thereby make it possible to produce the acoustic radiation pressure spatially and temporally varying. In this way, a particle to be moved need not pass a specific point exactly in order to be able to be subjected to the acoustic radiation pressure. Rather, it suffices if the particle passes through the more extended influence region of the ultrasound phased array, i.e. that region in which the ultrasound phased array can generate acoustic pressure. The use of an ultrasound phased array is particularly advantageous since, with one such, force effects can be effected at a plurality of locations at a given time so that a plurality of particles can be subjected in a targeted manner to acoustic radiation pressure at the same time. This means that, with an ultrasound phased array, particles can be subjected at the same time to acoustic radiation pressure at different locations, these locations being able to be separated by regions in which no acoustic radiation pressure is produced at the given time.

Ultrasound phased arrays, i.e. electronically controlled ultrasound group emitters, enable focusing of ultrasound waves so that acoustic pressure fields with local areas of maximum acoustic pressure, so-called acoustic focus can be produced.

Ultrasound phased arrays can be constructed from a linear or matrix-shaped arrangement of individual oscillator elements which generate ultrasound waves, e.g. with the help of the piezo effect. These can be actuated individually electronically by a signal generator and make it possible, e.g. by phase modulation, i.e. a defined temporal-offset excitation of the oscillator elements, to generate synthetic acoustic pressure fields $p_t$, e.g. with a specific acoustic irradiation direction, focal position and—size, for which purpose the array need not be moved mechanically. In W. Rauch, "New ejection principle for optical sorters in waste applications", in 7th Sensor-Based Sorting Control 2016, 2016, p. 141, the acoustic pressure field of a concrete 18×18 array is modelled and the resulting force within a focal point is derived and calculated. By means of a temporal variation in the phase modulation, the focal position can be shifted dynamically. In addition, also a plurality of different focal points can be produced at the same time, see in this respect T. Carter, S. A. Seah, B. Long, B. Drinkwater, and S. Subramanian, "UltraHaptics: multi-point haptic feedback for touch surfaces", in Proceedings of the 26th annual ACM symposium on User interface software and technology, 2013, p. 505-514, and S. Inoue, Y. Makino, and H. Shinoda, "Active touch perception produced by airborne ultrasonic haptic hologram", in 2015 IEEE World Haptics Conference (WHC), 2015, p. 362-367.

From the equation $$P=\alpha E=\alpha p^2/(\rho c^2)$$

it emerges that the acoustic radiation pressure P is proportional to the square of the entire acoustic pressure p which is produced by additive superimposition thereof during use of a plurality of ultrasound generators. An increased force effect on material particles (e.g. for a separation of particles with a fairly large mass) can therefore be achieved by an increase in the total acoustic pressure p. This can be achieved e.g. by an increase in the number of ultrasound generators or by an increase in the acoustic pressure of the individual ultrasound generators (e.g. by applying a higher input voltage, see in this respect also T. Hoshi, D. Abe, and H. Shinoda, "Adding Tactile Reaction to Hologram", in Proceedings—IEEE International Workshop on Robot and Human Interactive Communication, 2009, p. 7-11. for details).

The focal points are surrounded by an airflow which is produced by the accompanying pressure gradient. This can be described mathematically by Euler's equations of flow mechanics, see in this respect T. Hoshi, M. Takahashi, T. Iwamoto, and H. Shinoda, "Noncontact tactile display based on radiation pressure of airborne ultrasound", IEEE Transactions on Haptics, vol. 3, no. 3, p. 155-165, 2010 for details. This airflow can have negative effects on the separation process in specific situations since possibly air turbulences are produced which can cause an incorrect discharge (in particular lesser) of material particles. In a further complication, the generated focal points can be surrounded by local secondary pressure maxima which likewise produce local airflows even if these have a significantly lower acoustic radiation pressure and hence pressure gradients than the focal point (less by approx. a factor 20). For generating modulated acoustic radiation pressure fields for the material separation, it is therefore advantageous if these are generated by a method which minimises the number and the intensity of the secondary pressure maxima and/or jointly takes into account the induced airflows in an advantageous manner for the material separation. In addition, the strength of the induced airflow at a focal point can be affected by the impulse duration of the generated acoustic radiation pressure. Via Euler's equations of flow mechanics, it can be shown that the airflow can be reduced by shortening the impulse duration of the generated acoustic radiation pressure, see in this respect T. Hoshi, D. Abe, and H. Shinoda, "Adding Tactile Reaction to Hologram", in Proceedings—IEEE International Workshop on Robot and Human Interactive Communication, 2009, p. 7-11. for details.

Technically, it is possible to generate approximately any time-variable acoustic pressure fields $p_t$ (x,y,z) by a suitable phase modulation or signal generation. In A. Marzo, S. A. Seah, B. W. Drinkwater, D. R. Sahoo, B. Long, and S. Subramanian, "Holographic acoustic elements for manipulation of levitated objects", Nat. Commun., vol. 6, p. 8661, October 2015, a method is described with which special acoustic pressure fields can be produced for the manipulation of small objects. The phase modulation required for this purpose is preferably calculated algorithmically on a computer. With the calculated and generated acoustic pressure field, small objects can be displaced, rotated or kept hovering. This also includes the generation of attractive forces on objects in the direction of the ultrasound phased array. The acoustic manipulation of objects is also termed acoustophoresis or levitation and is used presently predominantly in biology/biochemistry for the manipulation and sorting of cells (P. Li inter alia, "Acoustic separation of circulating tumor cells", Proc. Natl. Acad. Sci., vol. 112, no. 16, p. 4970-4975, April 2015) and the transport of ultrasmall liquid quantities (D. Foresti, M. Nabavi, M. Klingauf, A. Ferrari, and D. Poulikakos, "Acoustophoretic contactless transport and handling of matter in air", Proc. Natl. Acad. Sci., vol. 110, no. 31, p. 12549-12554, July 2013).

With the method described in K. Melde, A. G. Mark, T. Qiu, and P. Fischer, "Holograms for acoustics", Nature, vol. 537, no. 7621, p. 518-522, September 2016, the production of complex acoustic holograms for the manipulation of small objects is further simplified and refined. For this purpose, special acoustically effective components are prepared and fitted in front of the ultrasound generators which then generate an acoustic pressure field with specified phase profile.

The method according to the invention makes it possible to sort the particles into two or three or even more different fractions. By using one or more ultrasound phased arrays as described above, the particles can also be provided for the sorting not only with a jet in one direction but can be moved on more complex paths, which increases the number of possible fractions.

In an advantageous embodiment of the invention, the acoustic radiation pressure can be generated as acoustic hologram, a technology which is described for example in A. Marzo, S. A. Seah, B. W. Drinkwater, D. R. Sahoo, B. Long, and S. Subramanian, "Holographic acoustic elements for manipulation of levitated objects", Nat. Commun., vol. 6, p. 8661, October 2015. As a result, the particles can be excited advantageously for a rotation and/or for a movement along specified paths. In this way, additional freedoms in the geometric design of a device used to implement the method result. In addition, the number of fractions into which the particles are sorted can be increased.

In an advantageous embodiment of the invention, a movement of the particles can be detected which is produced by the particles being subjected to the acoustic radiation pressure. Then from the detected movement, at least one physical property of the corresponding particle can be determined. For example a mass and/or a density of the corresponding particle can be determined. Basically, all properties which influence the reaction of particles to the acoustic radiation pressure can be determined in this way. An application, given by way of example for this, could be for example optical checking of simple semi-finished products, such as for example plastic balls, for air inclusions. Such air inclusions are not detectable externally and cannot be detected with conventional camera technology. The air inclusions act however on the mass of the observed particles. As a result of a specific excitation by an acoustic pressure field, a force burst can be exerted on the particles to be examined. As a function of the mass of the particles, i.e. the presence of air inclusions, the impulse or the movement behaviour of the particle is now changed. This change can be detected for example by an area camera and can be assessed so that the particles can be evaluated with reference to their mass and advantageously also be sorted.

Advantageously, the at least one detector can comprise one or more cameras with which the particles are detectable. In such an embodiment of the invention, all properties which can be determined with a camera can be used for the sorting. Advantageously in addition the movement of the particles as a result of being subjected to radiation pressure can be detectable with the camera. In this way, for example as described above here, also physical properties of the particles can be determined and used for the sorting.

The sorting method with the help of acoustic radiation pressure is not restricted to particles of specific sizes but is suitable in a particularly advantageous manner for particles, the particle sizes of which are less than or equal to 10 mm, preferably less than or equal to 5 mm, particularly preferably less than or equal to 2 mm. It is therefore preferred if at least one fraction of the particles in the material flow has such a particle size.

Advantageously, the acoustic radiation pressure can be generated by means of ultrasound. Advantageously, the ultrasound thereby has a frequency of greater than or equal to 10 MHz, preferably greater than or equal to 50 MHz, preferably greater than or equal to 100 MHz, particularly preferably greater than or equal to 300 MHz. An upper limit of the frequency need not be defined specifically. It can be given automatically by the technical production possibilities. The frequency of the ultrasound differs via the spatial resolution capacity of the generated acoustic radiation pressure fields. With higher frequencies, smaller acoustic structures can be produced, e.g. smaller focal points for smaller materials.

According to the invention, in addition a device for sorting particles of a material flow is indicated. The device has, according to the invention, a transport device for transport of the material flow. Such a transport device can thereby be any device which subjects the particles to a movement. It is not required that the transport device guides the particles over the entire course of the material flow. Also a device which ejects for example the particles so that these subsequently carry out a falling movement or slide, is to be regarded as transport device.

The device according to the invention has in addition at least one detector for observing the particles in the material flow. The detector can be for example an optical detector, such as e.g. a camera. Other types of detectors are possible as a function of the properties, by means of which the particles are intended to be sorted. With the detector, values of at least one property of the particles by means of which the particles are to be sorted and also at least one position of the particles at at least one point in time are detectable.

The device according to the invention has in addition a device for generating an acoustic radiation pressure or an acoustic radiation pressure field, with which particles with different values of the property can be supplied to different fractions.

The transport device can comprise for example a conveyor belt with which the particles in the material flow can be transported into a visual range of the detector and into an influence range of the acoustic radiation pressure.

Advantageously, with the device according to the invention, a method for sorting particles, as was described above, can be implemented. The explanations relating to the method according to the invention apply therefore correspondingly to the device according to the invention.

In the following, the invention is intended to be explained with reference to some Figures, by way of example. The same reference numbers thereby characterise the same or corresponding features. The features described in the examples can also be produced irrespective of the concrete example and combined with the examples.

BRIEF DESCRIPTION OF THE DRAWINGS

FIG. 1 shows, by way of example, an embodiment of a method according to the invention for sorting particles 1*a*, 1*b*, 1*c* of a material flow 1 into three fractions 2*a*, 2*b*, 2*c*. The particles 1*a*, 1*b*, 1*c* of the material flow 1 are thereby moved by means of a conveying device 3, here a conveyor belt 3, into the visual range of a detector 4, here an optical camera 4, so that the detector 4 can observe the particles 1*a*, 1*b*, 1*c* of the material flow 1. In order to improve visibility, the material flow 1 is illuminated by means of two light sources 6*a*, 6*b* and guided past in front of a background 5. In the illustrated example, the conveying device 3 transports the material flow 1 up to the background 5 and up to the visual range of the camera 4, in the visual range of the camera 4 however the particles 1*a*, 1*b*, 1*c* are in free fall. Instead of the conveyor belt 3, e.g. also chutes 3 and other transport devices could be used. The camera 4 can be e.g. a line—or area camera.

Figure 1:
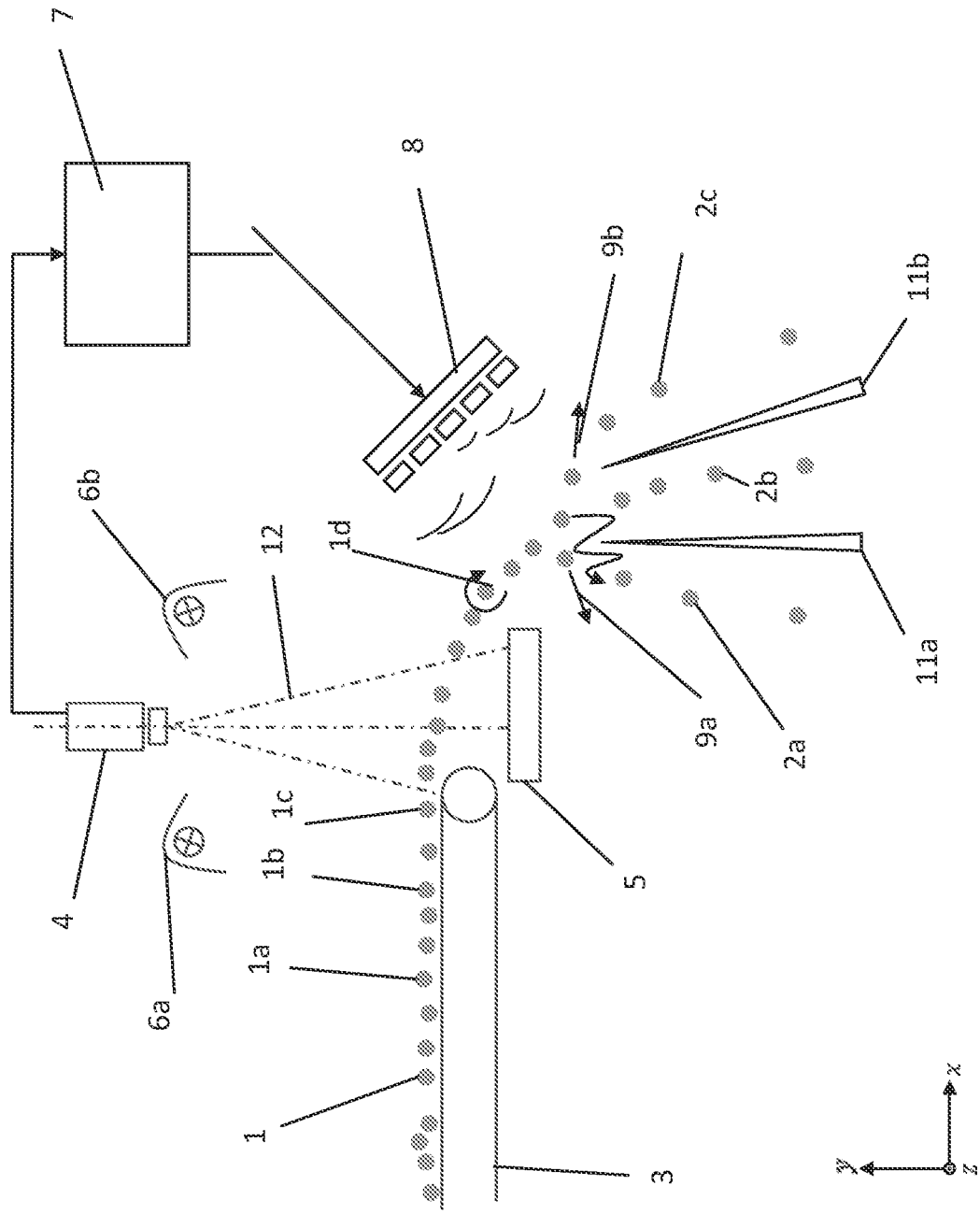
FIG. 1 an embodiment, by way of example, of a method according to the invention for sorting particles of a material flow into three fractions, FIG. 2 a further embodiment, by way of example, of such a method according to the invention, FIG. 3 a third advantageous embodiment of the method according to the invention, FIG. 4 an operating principle of an ultrasound phased array, FIG. 5 a schematic overview of different possible arrangements for implementing the method according to the invention and FIG. 6 a schematic flow chart of a method according to the invention.

The detector 4 measures values of at least one property, here an optical property of the particles 1*a*, 1*b*, 1*c*, by means of which the particles 1*a*, 1*b*, 1*c* are to be sorted. Furthermore, the detector 4 detects at least one position of the particles 1*a*, 1*b*, 1*c* at at least one point in time.

The detection results of the detector 4 are supplied to a computing unit 7 which assesses these results. For example, the recorded image can be assessed by image processing methods. The computing unit 7 can then come to a decision about sorting for each particle 1*a*, 16*b*, 1*c*, within the material flow 1. This decision indicates to which of the fractions 2*a*, 2*b*, 2*c* the particle should be supplied. Furthermore, the computing unit 7 calculates for each particle 1*a*, 1*b*, 1*c*, which must be subjected to an acoustic radiation pressure for supply into the fraction provided for it, the positions $x(t_0)$, $x(t_1)$, $x(t_2)$, . . . at the points in time $t_0$, $t_1$, $t_2$ . . . , at which the particles 1*a*, 1*b*, 1*c* pass through the spatial and temporal effective range of an ultrasound phased array 8. This can be effected for example by means of the method described in R. Gruna, "Conveyor system, unit for bulk material sorting with such a conveyor system and transport method", DE 102014207157 A1. Based on the sorting decision and also the movement information of all particles 1*a*, 1*b*, 1*c* to be subjected to acoustic radiation pressure within a time window, an optimum subjection point in time $t_{sep}$ and an acoustic pressure field $p_{t\ sep}$ (x, y, z) required for this are calculated in the computing unit 7. As a result, the objects to be ejected experience a force 9*a*, 9*b* with which they are deflected from their flight direction in free fall into the fraction 2*a*, 2*c* intended for them. In the example shown in FIG. 1, the method is designed such that a fraction 2*b* of the particles 1*a*, 1*b*, 1*c* is formed by the particles 1*a*, 1*b*, 1*c*, assigned to this fraction 2*b*, not being subjected to radiation connection so that they move further in free fall. This is the fraction 2*b*. In order to deflect the particles into the fraction 2*a*, these particles 1*a*, 1*b*, 1*c* are subjected to a pushing acoustic pressure field which exerts a pushing force 9*a*. In order to deflect particles 1*a*, 1*b*, 1*c* into the fraction 2*c*, these can be subjected to an acoustic pressure which exerts a drawing force 9*b*.

Generation of the acoustic pressure field $p_{t\ sep}$ (x, y, z) is effected by the ultrasound phased array 8 which is controlled via the computing unit 7. A force effect on the particles 1*a*, 1*b*, 1*c* can thereby also be effected multiple times by a plurality of successive acoustic pressure fields $p_{t\ sep,\ i}$ (x, y, z), i=1, . . . n, while the object passes through the effective range of the ultrasound phased array. In addition, particles 1*d* can be made to rotate or to move along defined paths by for example generation of acoustic holograms within the acoustic pressure field, e.g. by so-called acoustic traps, vortices and/or pincers, e.g. in order to avoid a collision with the surroundings or with other particles 1*a*, 1*b*, 1*c*.

The device shown in FIG. 1 has barriers 11*a* and 11*b*, by means of which the fractions 2*a*, 2*b*, 2*c* are separated from each other. Subjection to forces 9*a*, 9*b* by the ultrasound phased array 8 changes, in the example shown here, the trajectory in a different manner for the fractions 2*a*, 2*b*, 2*c* so that the corresponding particles 1*a*, 1*b*, 1*c* fall on different sides of the separating elements 11*a* or 11*b*.

In the example shown in FIG. 1, the camera 4 has a visual angle which leads to the visual range characterised with 12. The visual range 12 extends from the end of the transport device 3 up to the edge of the background 5 situated opposite the transport device 3, so that the particles 1*a*, 1*b*, 1*c* of the material flow 1 can be observed and detected by the camera 4 during their flight in front of the background 5.

In the examples shown here, the acoustic radiation pressure is generated by means of the ultrasound phase array 8. The element 8 can however be understood in all examples more generally also as acoustic radiation pressure source 8 which, in a simpler example, also needs to be fitted only to set up a one-dimensional radiation trap pressure impulse at a fixed location. This is adequate for example when the material flow 1 has particles 1*a*, 1*b*, 1*c* which are moving in a defined fashion in succession so that it can be assumed that the particles 1*a*, 1*b*, 1*c* are all moving past a defined point on which the acoustic radiation pressure source 8 can act.

Figure 2:
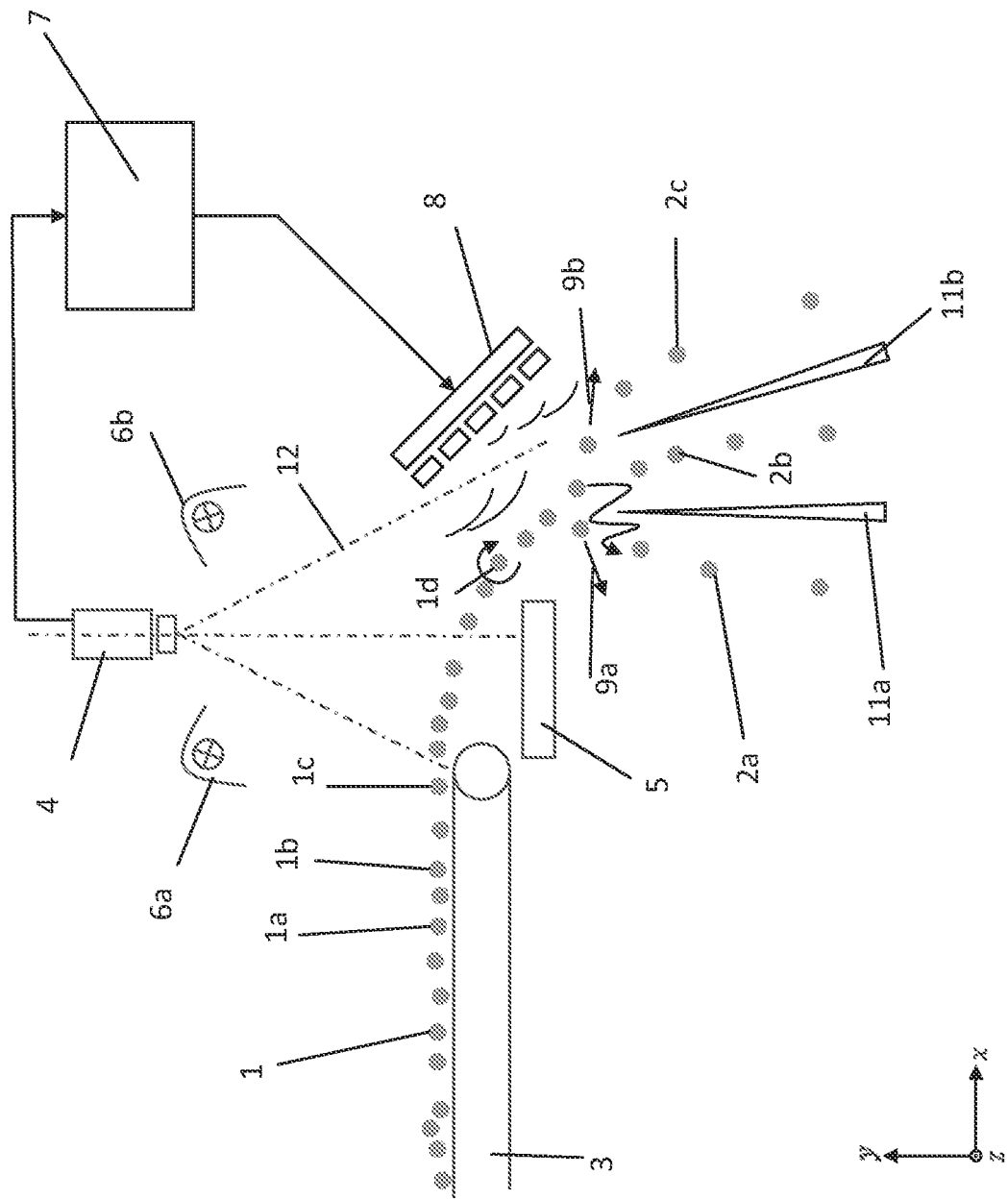

FIG. 2 shows an embodiment of the invention in which the camera 4 has a wider visual range 12. In FIG. 2, the visual range 12 extends from the end of the transport device 3 in the direction of the transport direction up to the influence range of the ultrasound phased array 8 on the particles 1*a*, 1*b*, 1*c*. The camera 4 can be for example a wide-angled area camera. Since the camera 4 in the example shown in FIG. 2 also observes the separation process in the influence range of the ultrasound phased array 8, the camera 4 can be used, in addition to the material checking and deduction of sorting decisions, also for observing the separation process. This makes it possible to adapt and to apply in real time a plurality of acoustic pressure fields adaptively to the actual movement behaviour of the particles 1*a*, 1*b*, 1*c* to be sorted. Consequently, a more precise and more robust separation of the particles 1*a*, 1*b*, 1*c* from the material flow 1 can be achieved by for example collisions with other particles being avoided and further sorting decisions being jointly taken into account subsequently. Alternatively to the illustrated wide-angled area camera, also a plurality of cameras with an overlapping visual field can be used.

The other features of FIG. 2 correspond to those of FIG. 1 so that reference should be made there to the description.

Figure 3:
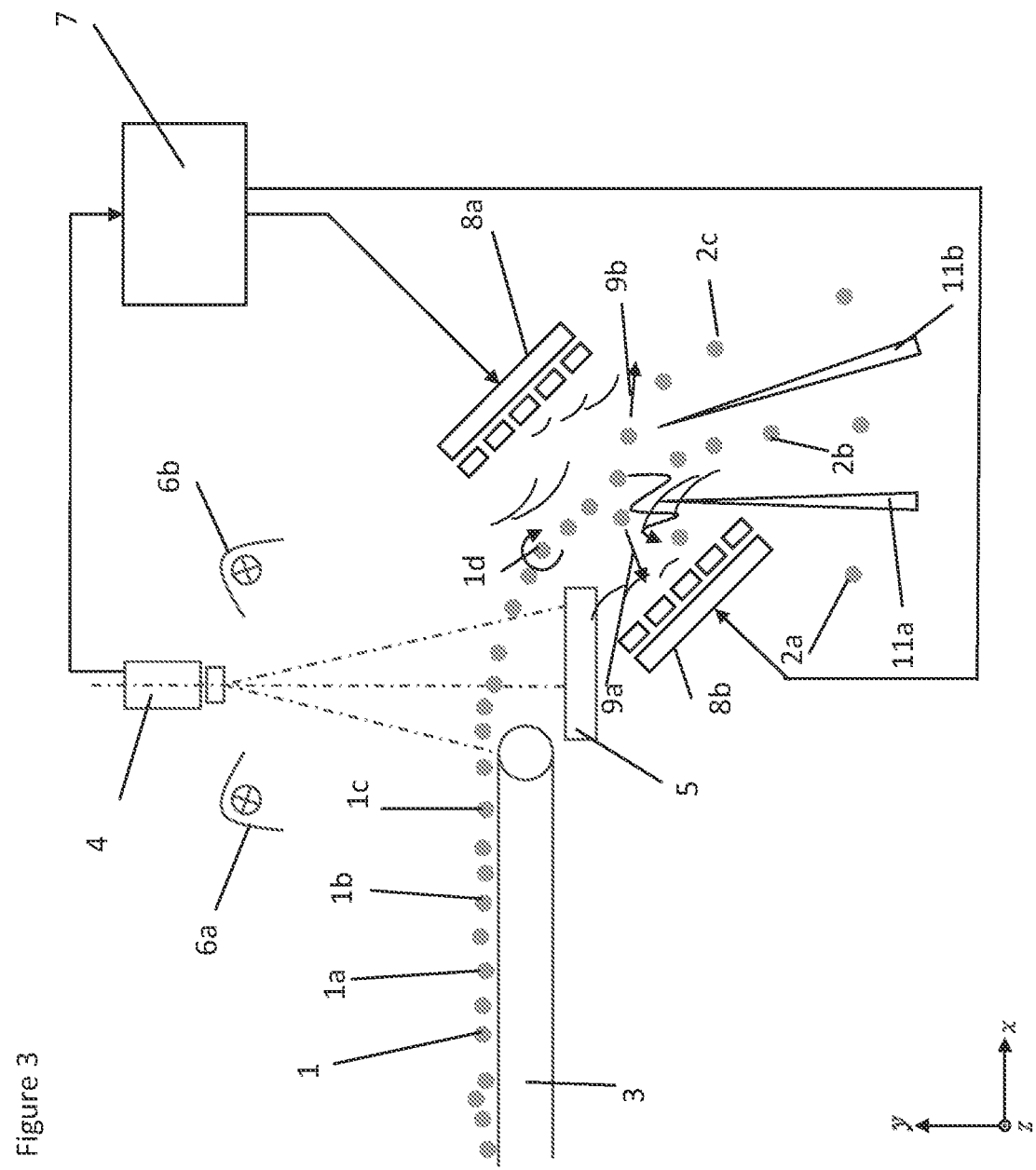

FIG. 3 shows an embodiment of the invention corresponding to FIGS. 1 and 2, however in addition to the ultrasound phased arrays 8 shown in FIGS. 1 and 2, a further ultrasound phased array 8*b* being used so that, in FIG. 3, two ultrasound phased arrays 8*a* and 8*b* are used. The ultrasound phased arrays 8*a* and 8*b* are disposed each in the example shown in FIG. 3 precisely opposite each other so that their surfaces are parallel to each other and their effective directions are opposite each other. The control device 7, based on the measuring results of the detector 4, controls both ultrasound phased arrays 8*a* and 8*b*. It has been shown that the signal generation with two oppositely situated ultrasound phased arrays 8a, 8b is generally simpler and less complex. As a result, the calculation complexity in the computing unit 7 can be reduced, as a result of which the material throughput during the bulk material sorting can be increased. The other features shown in FIG. 3 correspond to the features shown in FIGS. 1 and 2 so that reference should be made there to the description.

Figure 4:
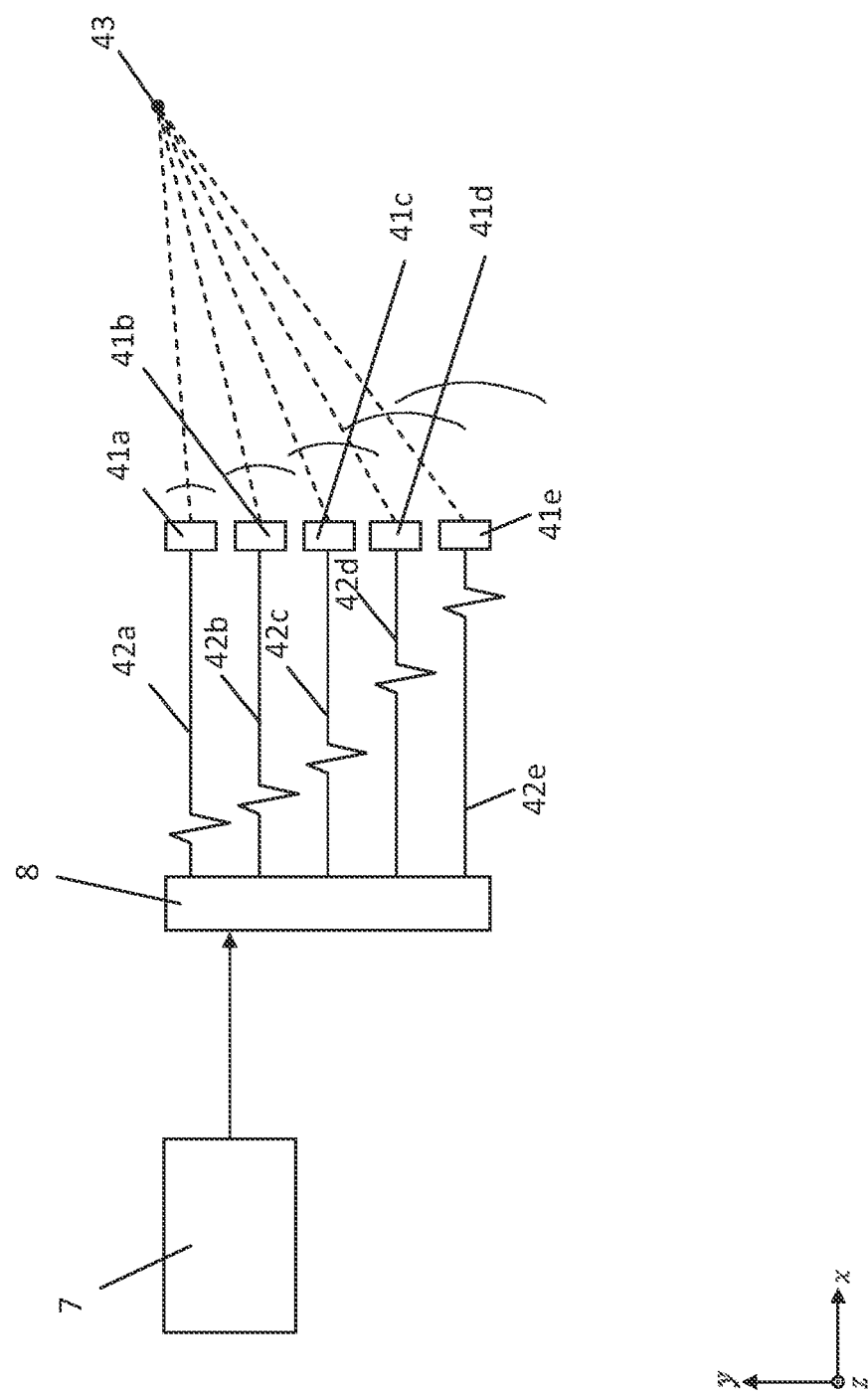

FIG. 4 shows, by way of example, an ultrasound phased array 8 with a control 7, as can be used in the examples shown in FIGS. 1 to 3. The ultrasound phased array 8 in FIG. 4 has a large number of piezo sound generators 41a, 41b, 41c, 41d, 41e which are subjected individually to control signals 42a, 42b, 42c, 42d and 42e. Each of the piezo sound generators 41a to 41e generates wave fronts which are superimposed to interfere. By controlling the amplitude and phase of the signals 42a to 42e with which the piezo sound generators 41a to 41e are subjected, the interference of the wave fronts generated by the sound generators 41a to 41e can be designed such that a maximum constructive interference is present at a specifically selected point 43. At such a point 43, the acoustic radiation pressure is maximum. The acoustic radiation pressure can therefore be adjusted with spatial resolution by specific control of the amplitude and phase of the signals 42a to 42e in a three-dimensional area in front of the ultrasound phased array 8. Wherever the maximum constructive interference is generated, then particles 1a, 1b, 1c for sorting are subjected to acoustic radiation pressure. The position and number of the simultaneously produced interference maxima can thereby be chosen basically at will so that even complex acoustic radiation pressure fields can be generated. For configuration of the signals 42a to 42e, the knowledge relating to acoustic holograms and contact-free tactile displays, explained in the above-described publications, can be used.

Figure 5:
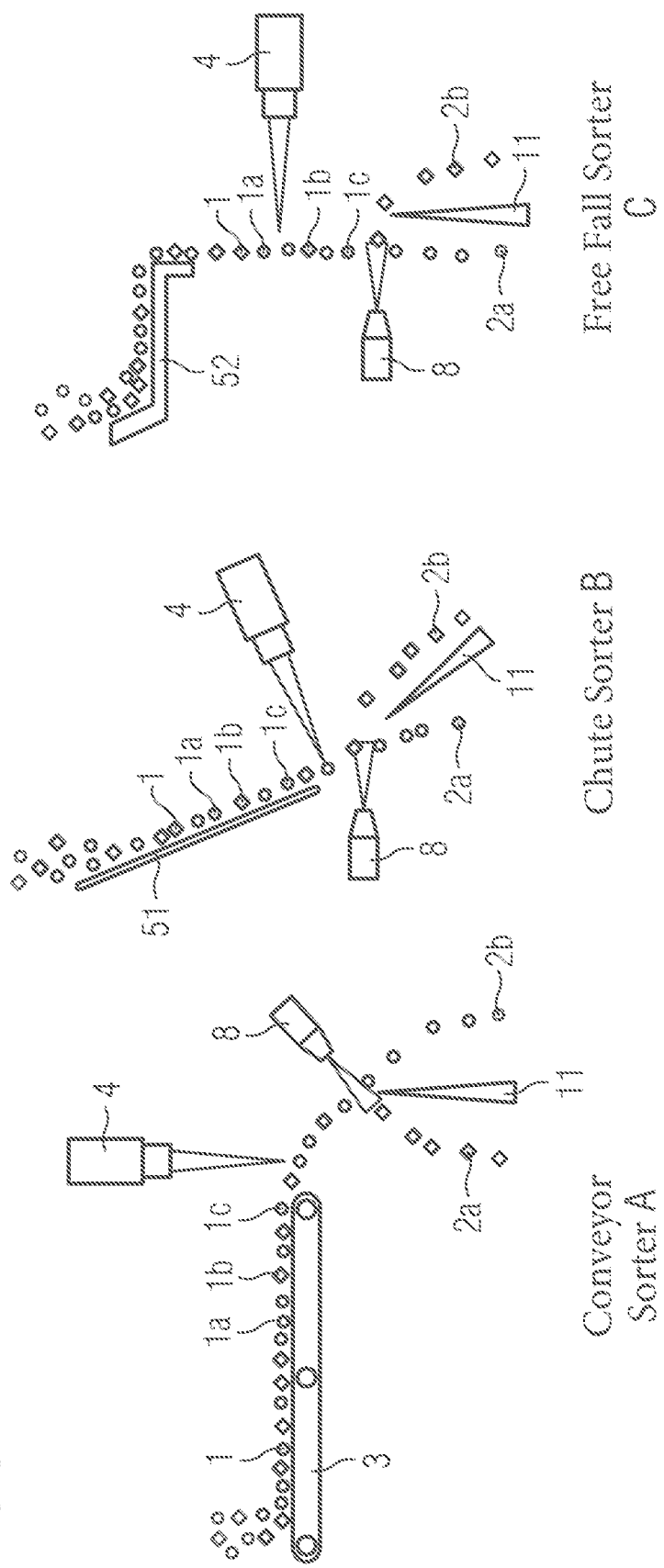

In the partial Figures A, B and C, FIG. 5 shows different concepts for guiding the material flow 1. The concept shown in FIG. 5A thereby corresponds to the concept shown in FIGS. 1 to 3 where the particles 1a, 1b, 1c of the material flow 1 are transported by means of a conveyor belt 3, then change into a free fall in the visual range of the camera 4 and, in free fall, are subdivided into different fraction 2a and 2b by a device 8 for generating acoustic radiation pressure. In FIG. 5, the device 8 is fitted to generate an acoustic radiation pressure in order to act merely one-dimensionally. However, an ultrasound phased array 8 as in FIGS. 1 to 3 can also be used respectively in FIG. 5.

The different fractions 2a and 2b are sorted by the acoustic radiation pressure source 8 on different sides of a separating device 11.

FIG. 5B shows an alternative embodiment in which the material flow 1 with the particles 1a, 1b, 1c slides on a chute 51, at the end of which the particles 1a, 1b, 1c again change into free fall. Here also, the particles 1a, 1b, 1c in free fall are detected by a detector 4 and sorted into two fractions 2a, 2b on different sides of a separating device 11 by a device 8 for generating an acoustic radiation pressure.

FIG. 5C shows an embodiment of the invention in which the particles 1a, 1b, 1c trickle down from a support surface 52 in order to form the material flow 1 during falling. The particles 1a, 1b, 1c are observed in free fall by the camera 4 and, on the basis of the observation, are sorted by means of the device 8 for generating an acoustic radiation pressure into two fractions 2a and 2b on different sides of a separating device 11.

In the partial Figures of FIG. 5, only those particles 1a, 1b, 1c which are intended to be assigned to one of the two fractions 2a, 2b are subjected to an acoustic radiation pressure, while the particles of the other fraction are not subjected to acoustic radiation pressure and consequently follow further their free fall trajectory.

FIG. 6 shows schematically a flow chart of an example of the present invention. In a first step S1, material which comprises the particles 1a, 1b, 1c to be sorted is provided. These are then transported in step S2 and thereby detected by a sensor in a step S3 by means of a detector 4. The detector signal is evaluated (e.g. colour images of the particle 1) in a signal evaluation S4 and a sorting decision is made for each particle. This sorting decision is supplied to a separation step S5 in which the particles are supplied to different fractions 2a, 2b, 2c on the basis of the sorting decision.

The invention claimed is:

1. A method for sorting particles of a material flow, the method comprising:
    detecting a first particle in the material flow using a detector;
    detecting, with the detector, a value of at least one property of the particle, and a position of the particle at a point in time;
    sorting the first particle into a first group or a second group based on the value of the at least one property detected with the detector, wherein the first group is a first fraction and the second group is a second fraction;
    supplying, based on the sorting, the first particle to one of the first group or the second group; and
    subjecting the first particle to an acoustic radiation pressure at an interaction location such that a second particle with a different value of the at least one property from the first particle is supplied to a different one of the first group or the second group.

2. The method according to claim 1, further comprising:
    generating the acoustic radiation pressure at the interaction location of at least one of the first particle or the second particle, wherein the interaction location is determined from the detected position of the at least one of the first particle or the second particle, and wherein generating the acoustic radiation pressure causes a force, dependent on the value of the property of at least one of the first particle or the second particle, on the at least one of the first particle or the second particle.

3. The method according to claim 2, wherein generating the acoustic radiation pressure includes generating the acoustic radiation pressure as an acoustic hologram, and wherein the at least one of the first particle or the second particle are excited such as to cause the at least one first particle or the second particle to at least one of rotate, or move along a specified path.

4. The method according to claim 1, wherein at least one of the first particle or the second particle are in free fall at the time of the detection of their position.

5. The method according to claim 1, wherein the interaction location of at least one of the first particle or the second particle is determined from the detected position of the at least one of the first particle or the second particle, movement of the at least one of the first particle or the second particle, and a geometry of a structure used to transport at least one of the first particle or the second particle in the material flow.

6. The method according to claim 1, wherein the acoustic radiation pressure is produced by a first ultrasound phased array.

7. The method according to claim 6, wherein the acoustic radiation pressure is produced by the first ultrasound phased array and a second ultrasound phased array, and wherein a first sound generation direction of the first ultrasound phased array, and a second sound generation direction of the second ultrasound phased array are disposed, relative to the material flow, at, at least one of a non-vanishing angle to each other or opposite each other, and are at least one of spatially or temporally varying.

8. The method according to claim 1, wherein a third particle is supplied to at least one of the first group or the second group.

9. The method according to claim 1, further comprising:
detecting a movement of at least one of the first particle or the second particle by subjecting the at least one of the first particle or the second particle to the acoustic radiation pressure; and
determining, in response to the detected movement, a physical property of the at least one of the first particle or the second particle, wherein the physical property is different from the at least one property.

10. The method according to claim 1, wherein the detector includes a camera.

11. The method according to claim 1, wherein a size of at least one of the first particle or the second particle is less than or equal to 10 mm.

12. The method according to claim 1, further comprising:
generating the acoustic radiation pressure by an ultrasound having a frequency of greater than or equal to 10 MHz.

13. The method of claim 1, wherein a third particle is supplied to a third group.

14. The method according to claim 1, wherein a size of the at least one of the first particle or the second particle is less than or equal to 5 mm.

15. The method according to claim 1, wherein a size of the at least one of the first particle or the second particle is less than or equal to 2 mm.

16. The method according to claim 1, further comprising:
generating the acoustic radiation pressure by an ultrasound having a frequency of greater than or equal to 50 MHz.

17. The method according to claim 1, further comprising:
generating the acoustic radiation pressure by an ultrasound having a frequency of greater than or equal to 100 MHz.

18. The method according to claim 1, further comprising:
generating the acoustic radiation pressure by an ultrasound having a frequency of greater than or equal to 300 MHz.

19. A device for sorting particles of a material flow, the device comprising:
a transport device for transporting the material flow;
a detector configured to observe a particle in the material flow, and further configured to measure a value of at least one property of the particle, and a position of the particle at a point in time; and
a device configured to generate an acoustic radiation pressure with which the particle can be supplied to either of a first group or a spaced-apart second group, based on the measured value of the at least one property.

20. The device according to claim 19, wherein the transport device comprises a conveyor belt configured to transport the particles in the material flow into a visual range of the detector and into an influence range of the acoustic radiation pressure.

* * * * *